No. 758,738. PATENTED MAY 3, 1904.
G. W. CULP.
CORN HARVESTER.
APPLICATION FILED JAN. 9, 1903.
NO MODEL. 5 SHEETS—SHEET 2.
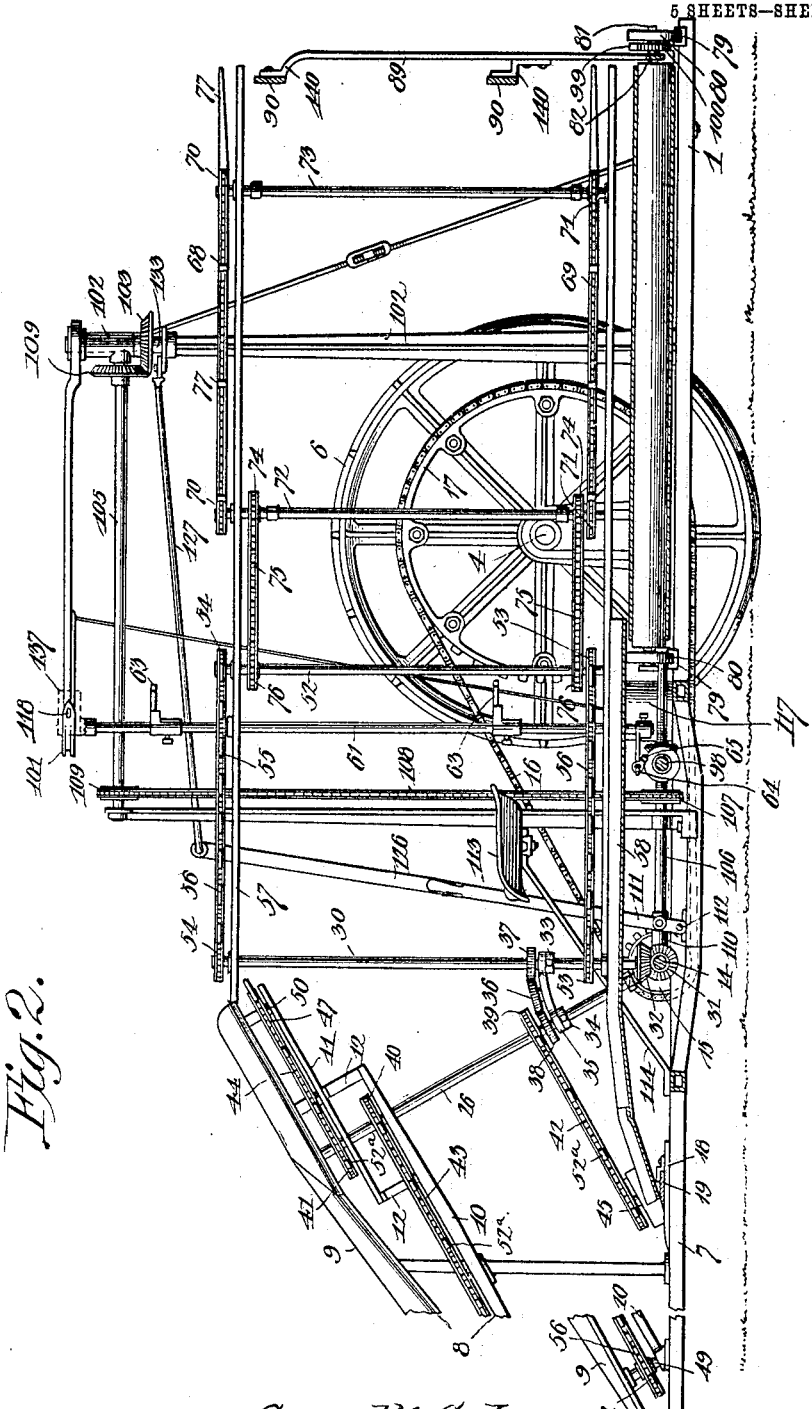
Witnesses
J. Frank Calverwell.
Wm. Ragger.
George W. Culp, Inventor.
by C. A. Snow & Co.
Attorneys No. 758,738. PATENTED MAY 3, 1904.
G. W. CULP.
CORN HARVESTER.
APPLICATION FILED JAN. 9, 1903.
NO MODEL. 5 SHEETS—SHEET 3.
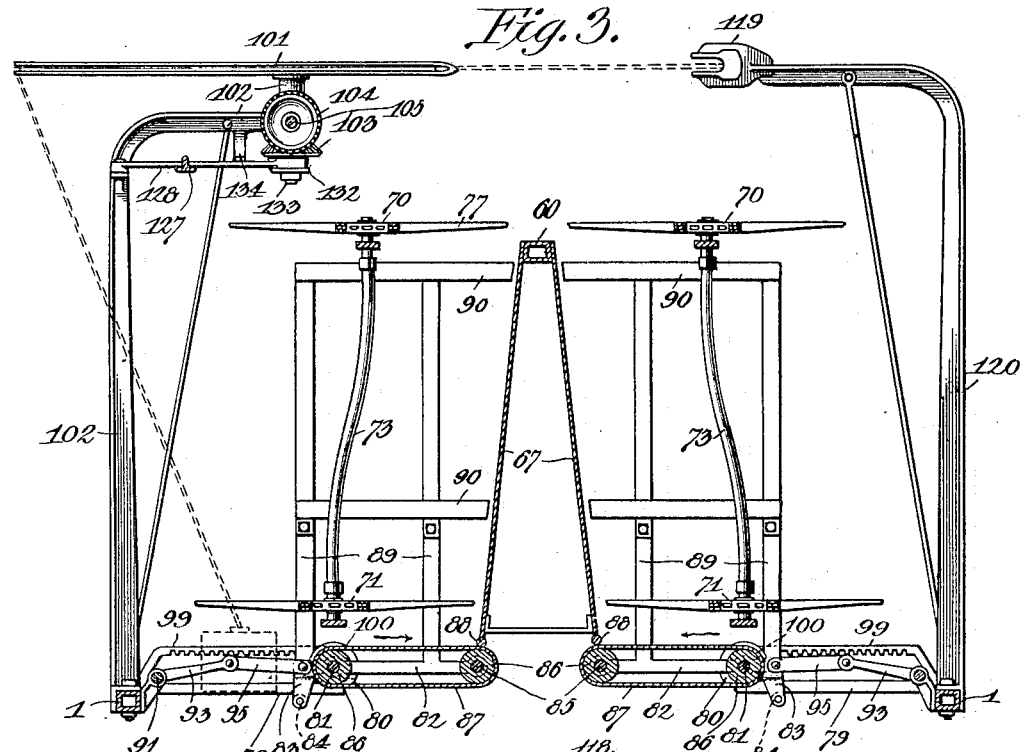
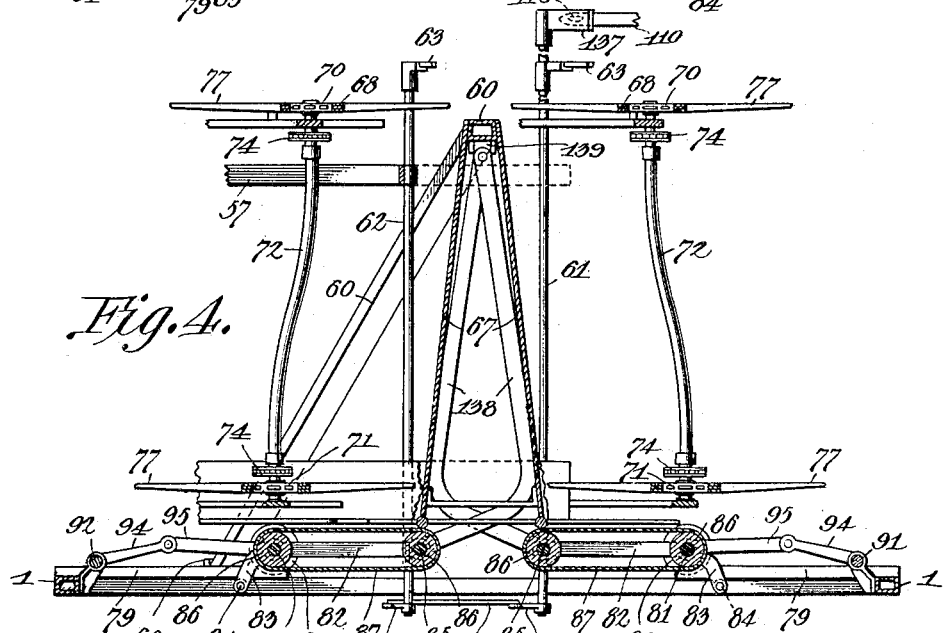

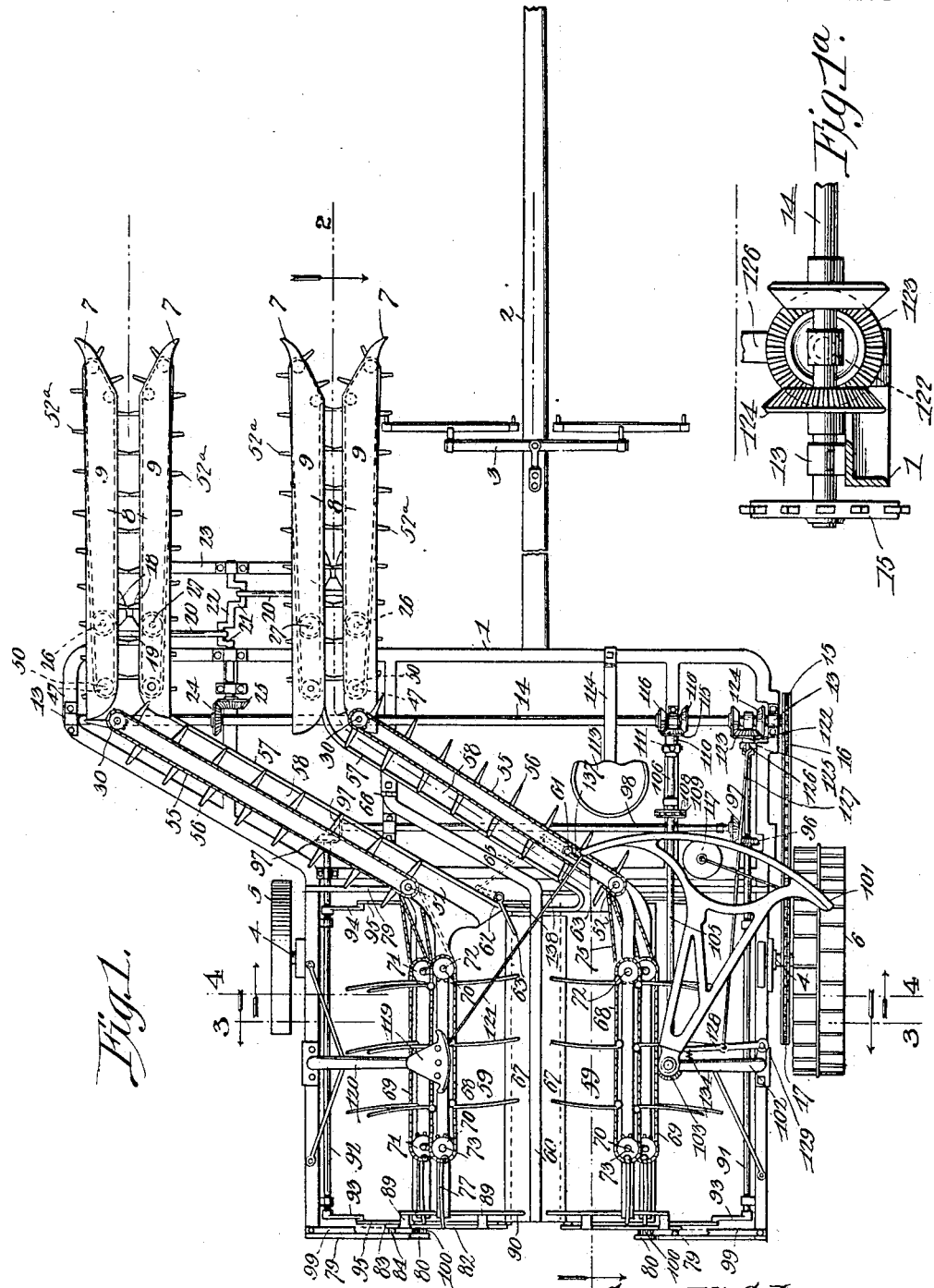

No. 758,738. PATENTED MAY 3, 1904.
G. W. CULP.
CORN HARVESTER.
APPLICATION FILED JAN. 9, 1903.
NO MODEL. 5 SHEETS—SHEET 4.
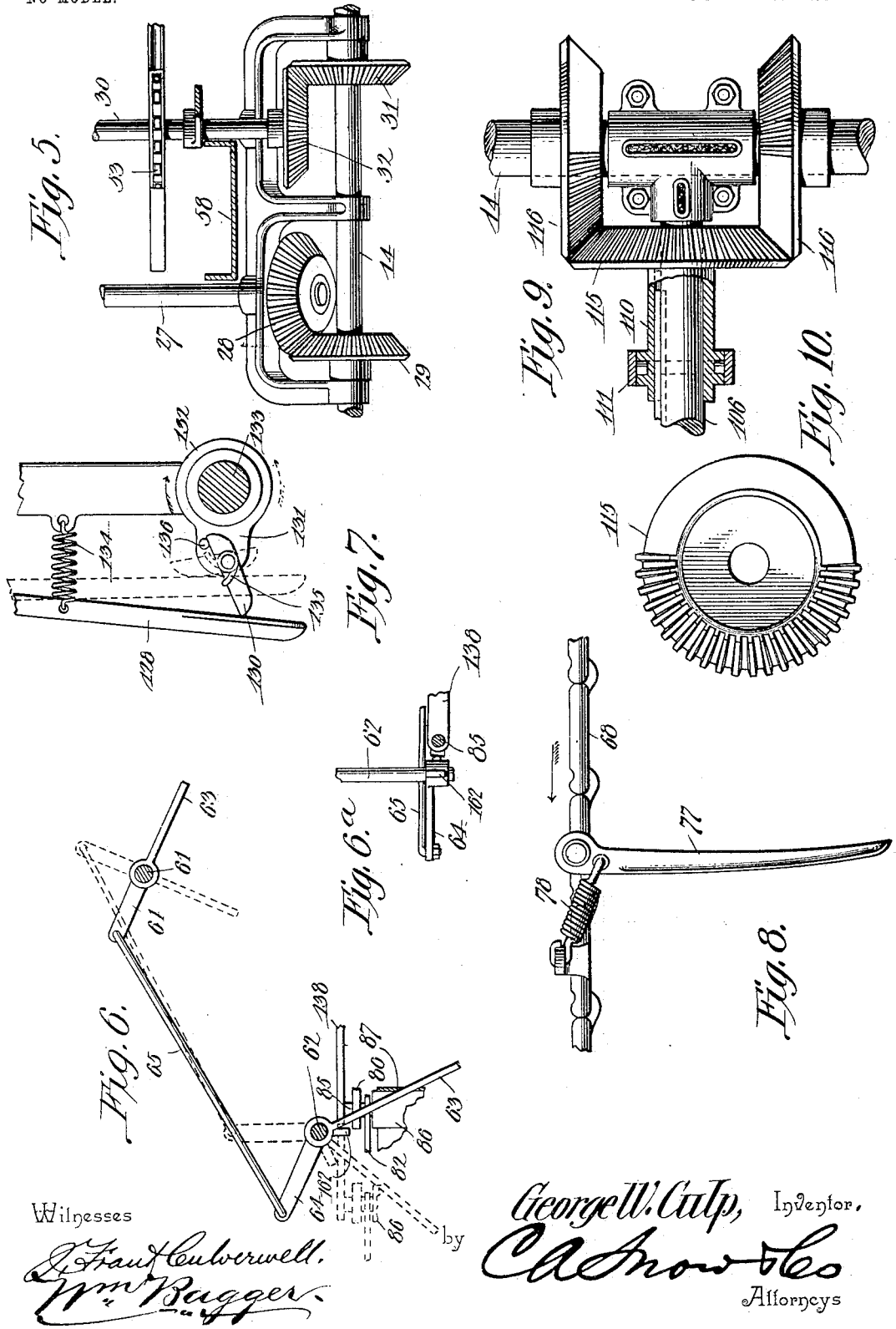

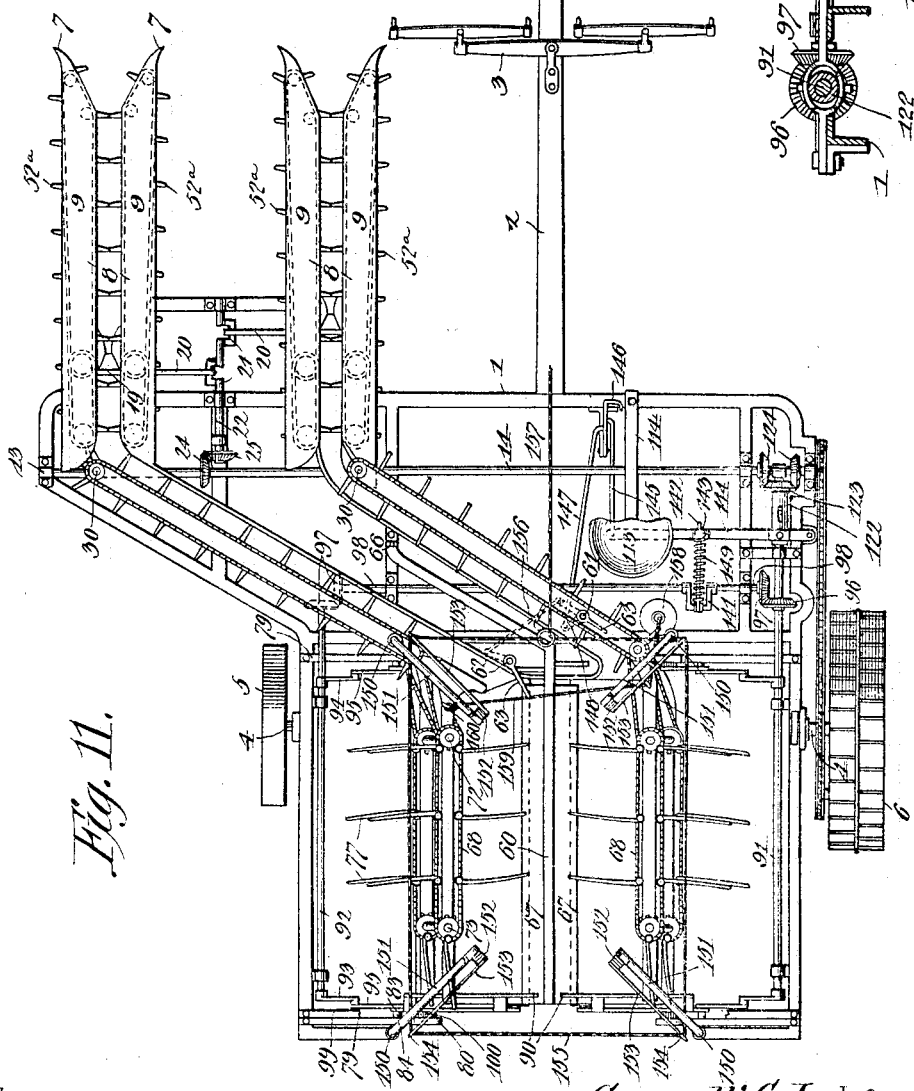

No. 758,738. Patented May 3, 1904.

UNITED STATES PATENT OFFICE.

GEORGE W. CULP, OF LYNDON, ILLINOIS.

CORN-HARVESTER.

SPECIFICATION forming part of Letters Patent No. 758,738, dated May 3, 1904.

Application filed January 9, 1903. Serial No. 138,423. (No model.)

*To all whom it may concern:*

Be it known that I, GEORGE W. CULP, a citizen of the United States, residing at Lyndon, in the county of Whiteside and State of Illinois, have invented a new and useful Corn-Harvester, of which the following is a specification.

This invention relates to corn-harvesting machines; and it has for its object to provide a machine of this class by means of which the stalks of corn may be cut, packed, tied in bundles or shocks, and deposited upon the ground in an upright position, the several operations necessary to effect this result being accomplished automatically by the machine.

With these and other ends in view the invention consists in the improved construction, arrangement, and combination of parts, which will be hereinafter fully described, and particularly pointed out in the claims.

In the accompanying drawings, Figure 1 is a top plan view of a corn-harvesting machine constructed in accordance with the principles of my invention. Fig. 1$^a$ is a detail view in elevation showing the bevel-gear 123 and related parts. Fig. 2 is a longitudinal vertical sectional view of the same, taken on the line 2 2 in Fig. 1. Fig. 3 is a transverse sectional view taken on the line 3 3 in Fig. 1, the needle 101 being, however, shown in elevation in order to enable the course of the binding-twine to be more conveniently traced. Fig. 4 is a transverse sectional view taken on the line 4 4 in Fig. 1, the needle 101 being omitted from this figure. Fig. 5 is a detail view of a portion of the operating means of the corn-guiding mechanism. Fig. 6 is a detail view of the means for obstructing the passage of the corn from the cutting mechanism to the packing-chamber. Fig. 6$^a$ is a detail elevation of the lower end of the shaft 62 and its related parts. Fig. 7 is a sectional view taken horizontally through the needle-shaft and showing adjacent and related parts. Fig. 8 is an enlarged detail view of a portion of one of the chains having hinged spring-actuated packing-arms, showing one of said arms. Fig. 9 is an enlarged plan view showing one of the half-gears and the bevel-gears operating in connection therewith. Fig. 10 is a detail face view of one of said half-gears. Fig. 11 is a top plan view showing my improved corn-harvesting machine adapted for use as a hand-binder. Fig. 12 is a detail sectional elevation of a modified means for operating the sleeve 122, carrying the half-gear 123 and related parts.

Corresponding parts in the several views are indicated by similar numerals of reference.

The frame 1 of my improved corn-harvesting machine, which may be and is preferably constructed of iron or steel, is made of a suitable size, shape, and general outline to support the operative parts of the machine, and it has a draft attachment, in this instance represented as consisting of a tongue 2, supporting a doubletree 3 of ordinary construction. The frame is supported upon wheels which are mounted upon stub-axles 4 at the sides thereof, one of said wheels being an ordinary supporting-wheel 5, while the other is a traction-wheel 6, having, preferably, a corrugated rim to engage the ground positively, and from this traction-wheel motion is transmitted to the various parts of the machine, as will be hereinafter more fully described.

My improved corn-harvesting machine or the example of it illustrated in the accompanying drawings is adapted to operate simultaneously upon two rows of corn, and it is accordingly provided with two sets of corn engaging, cutting, and carrying devices.

Two pairs of gathering-bars 7 7, suitably supported by the frame of the machine, extend in front of the latter, both pairs being disposed at the same side of the tongue. Inclined guides are supported at the front ends of said gathering-bars, from whence they incline upwardly and rearwardly, as will be understood by reference to Fig. 2 of the drawings. These inclined guides are composed of upper and lower members 9 and 10, suitably braced and connected together, and intermediate guiding-shelves 11 are interposed between their upper rear ends, said shelves being supported by means of braces or brackets 12.

The frame of the machine is provided near its front end with boxes or bearings 13 for a transverse shaft 14, which extends entirely across the width of the frame, which is widest at the front end, as will be seen in Fig. 1.

This shaft may be termed the "main" shaft of the machine. It receives motion by means of a sprocket-wheel 15, connected by chains 16 with a sprocket-wheel 17, mounted upon the inner side or upon the hub of the bull-wheel 6, and from it motion is transmitted to the working parts of the machine.

Each pair of gathering-bars supports a cutting apparatus comprising the guards 18 and reciprocating cutter-bars 19, which are connected, by means of pitmen 20, with cranks 21 upon a shaft 22, having its bearings upon braces 23, connecting the gathering-bars. It will be observed that by this construction one cutting apparatus is disposed in advance of the other. It is obvious, therefore, that only one stand of corn will be operated upon by the cutting apparatus at any one time, and excessive strain upon the machine is thereby prevented. Motion is imparted to the cutting apparatus by a pinion 24 upon the main shaft 14 engaging a pinion 25 upon the rear end of the crank-shaft 22.

26 26 designate a pair of forwardly and upwardly inclined shafts having bearings in the outer gathering-bars of each set and in the shelves or guides connected with said finger-bars, the said shafts being disposed at right angles to the said guides or shelves. The lower ends of said shafts may also be stepped in the frame of the machine, so as to provide suitable supports therefor. Similar inclined shafts 27 are journaled in the inner gathering-bar of each set and in the shelves or guides connected therewith. The lower ends of the shafts 27 are provided with pinions 28, meshing with pinions 29 upon the main shaft 14, from which they derive motion. A pair of vertically-disposed shafts 30 are suitably supported in the frame of the machine, one at the rear end of each of the outer gathering-bars 7. These shafts, which derive motion from the main shaft 14 by means of pinions 31 upon the latter meshing with pinions 32 at the lower ends of the shafts 30, are provided with set-collars 33, and similar set-collars 34 are mounted upon the inclined shafts 26. These set-collars 33 and 34 support brackets 35, having perforations through which the shafts revolubly extend, and these brackets support idle gears 36, that serve to transmit motion from the shafts 30 to the shafts 26 by engagement with pinions 37 38 upon said shafts.

Each of the shafts 26 and 27 are provided with three sprocket-wheels 39, 40, and 41, which are connected by chains 42, 43, and 44 with sprocket-wheels 45, 46, and 47, the first of which are disposed upon short shafts or stubs 48, mounted intermediately upon the gathering-bars. The sprockets 46 are mounted upon shafts 49 at or near the front ends of the gathering-bars, and the sprockets 47 are mounted upon the shafts 50, having bearings in the guides or shelves 9 and 11 at the upper rear ends of the latter. Auxiliary guide pulleys or sprockets may be provided at the points of the gathering-bars, as indicated in dotted lines in Fig. 1. The sets of endless chains, each set comprising the chains 42, 43, and 44, are provided with laterally-extending fingers 52$^a$, adapted to engage the corn. It will be understood that by this construction each pair of gathering-bars and guiding-shelves is provided with endless carrying apparatus, each carrying apparatus comprising two sets of three endless chains or carriers, the inner leads of which move in the same direction, so that they will coöperate to engage the stalks of corn entering between the diverging front ends of the gathering-bars and to maintain the stalks in an upright position while passing between the guiding-shelves in a rearward direction as the machine is progressing over the field. It will be also understood that by the construction and arrangement of the endless carrying means herein described corn that is down will be successfully picked up and raised to a standing position to enable it to be conveniently operated upon by other parts of the machine.

The corn engaging and cutting mechanism, as will be seen from the foregoing description, is entirely disposed at one side of the line of draft of the machine. In order to prevent excessive and unequal strain, I have located the packing and binding mechanism more directly in the line of draft, and in order to convey the corn standing from the cutting to the packing and binding mechanism I avail myself of carrying devices which will convey the corn laterally from the discharge ends of the cutting devices to the receiving ends of what may be termed the "packing-chambers." These carrying devices include the vertical shafts 30 and vertical shafts 52, which latter are suitably journaled in the frame of the machine. I desire it to be understood that when the frame of the machine is mentioned I thereby include the entire frame structure, which is obviously to be provided with suitably-braced supporting means and bearings for the various shafts and operating means which enter into the organization of the machine. It is obvious that such braces and supporting means are to be provided at all points where their presence shall be required, although it may not be considered necessary to make special reference to the individual parts or members of the frame organization.

The shafts 30 and 52 are provided near their lower and upper ends with sprocket-wheels 53 and 54 for the endless conveyer-chains 55, which are provided with fingers 56 to engage the corn. The endless conveyers formed by said chains will be driven from the shafts 30, as will be readily understood. Guide-rails 57 and supporting-shelves 58 are extended laterally in a rearward direction from the discharge ends of the cutting devices to the receiving ends of the packing-chambers, which latter are designated 59, one packing-chamber being disposed on each side of a centrally-disposed ridge 60. It is obvious that the endless carriers 55, as well as the supporting-shelves and guides, are to be properly related to each other and to the cutting devices and the packing-chambers, the guiding means especially being so disposed as to prevent the corn from passing in any except the indicated direction.

Near the rear ends of the endless carriers 55 are disposed vertical shafts 61 and 62, the former of which is disposed in advance of the latter. These shafts are provided with radially-extending arms 63, constituting what I choose to term "gates," which when swung across the path of the corn constituted by the guide-rails 57, shelves 58, and the endless carriers 55 will prevent the passage of the corn into the packing-chambers of the device. The means for operating said doors and the purpose of their presence will be hereinafter more fully described. I will state, however, that the shafts 61 and 62 are provided at their lower ends with radially-extending arms 64, connected by a link rod 65 for the purpose of transmitting motion between them, so that the operation of the gates shall take place simultaneously.

The ridge-beam 60 is extended laterally at its front end and is connected, by means of a hinge 66, with an upright or bracket which constitutes a part of the frame. The longitudinal main portion of the ridge-beam supports a pair of downwardly and outwardly diverging or inclined shields 67, which may be said to constitute the inner walls of the packing-chambers, the outer walls of said chambers being formed by endless chains 68 and 69, mounted upon sprocket-wheels 70 and 71, disposed, respectively, near the upper and lower ends of pairs of vertical supports 72 and 73, disposed, respectively, near the front and rear ends of the packing-chambers and suitably supported in their respective locations. The hubs of the sprocket-wheels 70 and 71 upon the front uprights 72 are provided with auxiliary sprocket-wheels 74, which are connected, by means of chains 75, with sprocket-wheels 76 upon the shafts 52, from which motion is thus transmitted to the endless chains, which may be said to constitute the outer walls of the packing-chambers. It will be observed that the lower ends of the supports 72 and 73 are bent or curved outwardly, so as to lie beyond the planes of the upper ends of said supports, the object of this construction being to dispose the upper and lower chains 68 and 69 at about equal distances from the upper and lower ends of the shields 67, constituting the inner walls of the packing-chambers. The endless chains 68 and 69 are provided at suitable intervals with pivoted arms 77, which serve as packing-arms and which are held in operative position by means of springs 78. As the packing-chambers become filled with corn the springs 78 will permit the arms 77 to yield, so that their progress shall not be interfered with by the contents of the packing-chamber, which by the action of said arms will be compactly packed in the said chambers, as will be readily understood, the corn first entering into the chambers being carried rearward by the said packing-arms and packed or compressed by the action of said packing-arms first at the rear ends of the chambers and gradually through the length of the chambers. It is also obvious that corn will be carried in a standing position, but that at the same time the contents of the two packing-chambers will be tilted in the direction of each other at the upper ends of said chambers following the incline of the inner wall 67, and thus forming the corn into the approved shape of a shock.

I have described the inner and outer walls of the packing-chambers and the means whereby the corn is conveyed into and packed in the said chambers. I shall now proceed to describe the devices which form the floors and rear end-gates of the said chambers, said floors and end-gates being movable in order to admit of the discharge of the shock.

The frame of the machine is extended inwardly at the lower end of each of the packing-chambers to form tracks 79 at the rear and front ends of said packing-chambers, said tracks supporting rollers or wheels 80 at the front and rear ends of a pair of shafts 81, which are disposed longitudinally with relation to the frame of the machine. Upon the front and rear ends of the shaft 81, adjacent to the wheels 80, are pivotally mounted bars 82 provided with downwardly-curved outer ends 83, provided with friction-rollers 84, engaging under the track-bars 79, and thus serving to sustain the inwardly-extending members of the arms 82 in approximately horizontal positions. The inner ends of the arms 82 afford bearings for shafts 85, and the latter, as well as the shafts 81, are provided with rollers 86 for the endless aprons 87, the upper leads of which form the floors of the packing-chambers. As will be readily seen in Figs. 3 and 4 of the drawings, the roller carrying-shafts 85 are normally disposed under the lower edges of the shields 67, which form the inner walls of the packing-chambers, and said shields being preferably constructed of sheet metal are provided at their lower edges with seams 88 to prevent injurious friction by the contact of the parts.

Standards 89, carrying cross pieces or braces 90, are supported at the rear ends of the frames which carry the aprons 87 and are movable with said frames. These standards and cross-braces constitute the rear end-gates of the packing-chambers, as will be readily understood.

Shafts 91 92, disposed longitudinally at the sides of the frame, are provided with suitably-disposed cranks 93 and 94, which are disposed in approximate alinement, respectively, with the rear and with the front ends of the frames carrying the roller-aprons which constitute the floors of the packing-chambers, said cranks being connected with said frames by means of links 95, the inner ends of which are pivotally connected therewith. It will be observed that when the said shafts are partially revolved in the proper directions the frames carrying the roller-aprons will be caused to travel outwardly upon the tracks 79, thus withdrawing the aprons which form the supports or floors from the lower ends of the packing-chambers. The shafts 91 and 92 are provided with bevel-gears 96, meshing with bevel-pinions 97 upon the ends of a transversely-disposed shaft 98, so that the operation of one shaft shall impart a corresponding movement to the other.

Suitably disposed and supported in alinement with the rear track-bars 79 are toothed bars or racks 99, meshing with pinions 100 upon the rear ends of the shafts 81. It will be understood that when the frames carrying the endless roller-aprons 87 are moved outwardly by the mechanism first described the pinions 100 by engaging the racks 99 will impart rotary movement to the shafts 81, thus causing the upper leads of the roller-aprons to move in the direction of the arrow shown in Fig. 3, which is opposite to the direction of the movements of the supporting-frame. The supporting means will thus slide without friction from beneath the butt-ends of the cornstalks supported thereon. The importance of this feature of my invention will be readily appreciated when the weight and the rough and uneven character of the load supported upon these slidable supports are taken into consideration, my improved device being capable of being efficiently operated with a comparatively very slight expenditure of power.

The preferred binding mechanism used in connection with my invention comprises a needle 101, mounted upon a shaft journaled in a standard or support 102, the shaft of said needle carrying a bevel-pinion 103, meshing with a bevel-gear 104 upon a shaft 105, supported in suitable bearings, as clearly shown in Fig. 2 of the drawings. 106 designates a shaft journaled below and parallel with the shaft 105 and provided with a sprocket-wheel 107, connected by a chain 108 with a sprocket-wheel 109 upon the said shaft 105, to which motion is thus transmitted and which in turn transmits motion to the needle. It is obvious, however, that the movement of the shafts 105 and 106 is not intended to be a continuous rotary but rather a rocking or oscillating movement, extending through about one-half of a revolution or of an extent merely sufficient to impart the desired swing or throw to the needle. To effect this movement, I avail myself of mechanism comprising a sleeve mounted slidably upon the shaft 106. Said sleeve, which is designated 110, is loosely connected with a hand-lever 111, fulcrumed at 112 upon the frame of the machine and extending upwardly within convenient reach of the driver, whose seat 113 is supported upon a spring-bar 114 in close juxtaposition to said lever. The sleeve 110 carries at its front end a gear-wheel 115, adapted to mesh with either one of a pair of oppositely-faced half-gears 116, secured upon the main shaft 14. It will be understood that when the driver operates the lever 111 to move the sleeve 110 in a forward direction the gear-wheel 115 will be successively engaged by the oppositely-faced half-gears 116, thus causing an oscillating or rocking movement of the extent of one-half revolution to be imparted to the shaft 106, from which it is transmitted to the shaft 105, which latter, through the mechanism described, imparts to the needle the desired oscillating movement in a horizontal plane. It is obvious that the extent of the swinging movement of the needle may be regulated by properly proportioning the sizes of the bevel-pinions 103 and 104.

117 designates the twine can or receptacle, from which the binding-twine extends to the heel of the needle along the curvature of the latter to the needle-point 118 and thence across the packing-chambers directly in the path of the corn to the knotter 119, which is supported upon a standard 120. The twine is designated 121.

The shaft 91, which has been hereinbefore described as being provided with cranks 93 and 94, connected with and serving to transmit motion to one of the frames carrying the aprons which constitute the floors of the packing-chambers, is provided at its front end with a slidable sleeve or hub 122, carrying a gear-wheel 123, adapted to mesh with either one of a pair of oppositely-faced half-gears 124 upon the main shaft 14, so that when the gear-wheel is thrown into engagement a rocking motion extending over one-half of a revolution shall be imparted to the said shaft 91 and thence transmitted to the shaft 92, with the result that the flooring devices of the packing-chambers shall be simultaneously withdrawn in an outward direction and again restored to normal or operative position. The sleeve 122 is engaged by an annular collar 125, which is connected loosely with a lever 126, pivoted to the frame of the machine. The lever 126 is extended upwardly, and its upper end is connected by a link-rod 127 with a lever 128, fulcrumed at 129 and extending into the path of a pivoted spring-actuated catch 130, supported upon an arm 131, that extends radially from a hub 132 upon the shaft 123, that carries the needle. A retracting-spring 134 connects the lever 128 with the needle-support and serves, through the medium of said lever, the connecting-rod 127, and the lever 126, to retain the gear-wheel 123 normally in an inactive position. The catch 130 is actuated by a light spring 135, the tendency of which is to normally project the end of said catch beyond the radial supporting-arm 131, as will be seen in full lines in a detail view Fig. 7 of the drawings, the said catch being retained in this position by means of a stop-pin 136. The normal or inactive position of the parts is indicated by dotted lines in said figure, the catch 130 being swung back against the tension of the spring 135 by the action of the lever 128, actuated by the retracting-spring 134. It will be seen that when the needle starts and moves in the direction indicated by the dotted arrow the catch 130 will slide past the lever 128 without affecting the position of the latter. As soon, however, as the point of the lever is passed the tension of the spring 135 will cause the catch 130 to assume the position shown in full lines. When the needle has completed its forward throw and is on its return movement, the projected end of the catch 130 will engage the lever 128, throwing the free end of the latter in a forward direction against the tension of the retracting-spring and transmitting, through the connecting-rod 127, a vibrating movement to the lever 126, whereby the gear-wheel 123 is thrown into engagement with the half-gears 124, and thus imparting to the shaft 91 and thence to the shaft 92, the oscillating or rocking movement necessary to cause the flooring devices to be withdrawn from the packing-chambers and again restored to position thereunder, the movement of the flooring devices being followed by the rear end-gates, which are supported thereby. It will be observed that this operation is timed to take place immediately after the tying of the bundle, which is accomplished by the conjoint action of the needle and the knotter, both of which are of ordinary construction, which forms no part of my invention.

The operation of this form of my invention will be readily understood from the foregoing description, taken in connection with the drawings hereto annexed. When the machine progresses over the field, two rows of corn are simultaneously engaged by the guiding devices and the cutting apparatus connected therewith, said cutting apparatus being, however, disposed as stated, so that at no time will two stands of corn be simultaneously operated upon by the cutters. The corn passes in a standing position from the discharge ends of the guiding devices to the receiving ends of the packing-chambers, being, however, intercepted by the binding-twine 121, which is thus looped around the rear of the shock. When in the judgment of the driver a sufficient quantity of corn has accumulated in the packing-chambers to form a shock, he operates the hand-lever 111 to move the sleeve 110 in a forward direction, causing the gear-wheel 115 to be engaged by the half-gears 116, and thus operating the needle to tie the shock. The needle on its forward movement comes into engagement with an arm 137 at the upper end of the gate-carrying shaft 61, which is thereby operated to close the gates across the path of the corn leading to the packing-chambers and preventing the entrance of corn into the said chambers while the operations of tying and depositing the shock are taking place. The backward or return movement of the needle serves to actuate the connecting means whereby the gear-wheel 123 is thrown into engagement with the half-gears 124, whereby the supports are withdrawn from under the shock and the latter is deposited upon the ground.

A pair of links or toggles 138 are connected pivotally with the shafts 85 at their lower ends, which are crossed, as will be seen in Fig. 4, and the upper ends of said toggles are connected pivotally with a block 139 upon the under side of the ridge-beam 60, which, as hereinbefore described, is hinged at 66, thereby permitting it to be dipped or lowered by the action of said toggles when the lower ends of the latter are spread apart by the outward movement of the frames carrying the roller-aprons. This movement of the ridge-bar, with its related parts, permits the shock to be gradually lowered to its final position upon the ground, where it is left in an upright position, while the machine passes out of engagement therewith, the parts of the machine being all automatically restored to normal operative position. The shaft 62 is provided near its lower end with a projection 162, that lies in the path of one of the toggles 138. When the gates swing shut, the said toggle engages the said projection, as will be clearly seen in dotted lines in Fig. 6, and assists in retaining the gates in a closed position. As soon as the tying and dropping operations have been performed the driver releases his pressure upon the hand-lever 111 and restores the latter to its normal position. The gates 63 will swing open automatically when released from contact with the needle and when the toggle 138 passes out of engagement with the projection 126 by the pressure of the corn passing toward the packing-chambers, and the machine will progress uninterruptedly upon its course.

I desire it to be understood that when this form of my improved corn-harvesting machine is adopted I may supplement the same by arranging binding means at points intermediately between the discharge ends of the guiding and cutting devices and the receiving ends of the packing-chambers, so as to tie the corn into bundles before the delivery of the same into the packing-chambers. The addition of such auxiliary binding means would not interfere with the herein-described construction and operation of the remaining parts of the device, such binding means being composed of needles and knotters adapted to be operated in practically the same manner as the needle and knotting mechanism which has already been referred to as being employed for the purpose of tying the shock. These parts, it will be observed, are not claimed as features of my invention, inasmuch as separately considered their construction is old and well known. My claims for novelty are based upon the correlation of these with other parts of the device.

Before leaving this form of my invention I desire to state that the cross-bars 90, which coöperate with the uprights 89 to form the rear end-gates of the packing-chambers, are preferably mounted upon the inner sides of brackets 140, extending inwardly or forwardly from the said uprights 89. It will be observed that by this construction the said uprights 89 are prevented from interfering frictionally with the shock when withdrawn laterally in the act of depositing the shock upon the ground.

In the foregoing I have described my improved corn-harvester as being provided with automatic binding means, which may be properly said to be the preferred form of the invention; but it may at times be desired in order to save expense to dispense with the automatic tying device and to substitute therefor a hand tying device, which, however, will involve only slight departures from the construction already shown and described.

In Fig. 11 of the drawings I have illustrated my improved hand-binding corn-harvester. In this form the needle and the knotter, with their supporting means, are of course dispensed with, as is the shaft 106 and the related parts whereby motion is transmitted from said shaft to the needle. The means whereby the movement of the latter is utilized to operate the sleeve 122, carrying the half-gear 123, are likewise dispensed with; but said sleeve and half-gear are retained, as well as the shafts 91 and 92 and the means for transmitting motion between the said shafts—namely, the shaft 98. The latter, however, is in this form provided with a crank 141, having a pitman or rod 142, which extends through an opening 143 in a lever 144, which is pivotally mounted upon the frame and which has a suitable connection with the sleeve 122. The free end of the lever 144 is connected by a link 145 with a foot-lever 146, which said foot-lever is also connected by a pivoted rod 147 with an arm 148, extending radially from one of the gate-carrying shafts 61. A spring 149, coiled upon the rod or pitman 142, has its ends connected, respectively, with the pivoted end of said pitman and with the lever 144, so that it may operate either as a retracting or as an expansion spring. When this form of the invention is used, it will be seen that pressure of the driver's foot upon the foot-lever 146 will serve to close the gates 63 across the path of the corn traveling from the cutting devices to the packing-chamber. At the same time the lever 144 will be actuated to move the sleeve 122, carrying the bevel-gear 123, in a forward direction and into operative position with relation to the half-gears 124. This operation will be exercised against the tension of the spring 149, which becomes slightly stretched, as will be readily understood. As soon as the oscillatory movement of the shaft 98 begins, however, the crank 141, the position of which is normally in a rearward direction, will perform an approximately half-revolution, thus compressing the spring 149 and exercising a forward pressure upon the lever 144, so that the pressure of the driver's foot may be discontinued immediately after the initial movement of the foot-lever, if so desired, because the pressure of the spring 149 when compressed under the action of the crank will securely retain the sleeve 122 and its related parts in engaged or operative position. When the reverse movement of the crank 141 takes place, the pressure upon the spring becomes gradually relaxed until finally the normal state of expansion of said spring being passed and exceeded the contractive tendency of said spring will be exercised to draw the lever 144 and its related parts, including the foot-lever and the sleeve 122, to their normal inactive positions. The automatic binding mechanism having been dispensed with, I have recourse in this form of my invention to a hand-binding device, which is illustrated in Fig. 11 of the drawings. This device comprises four uprights or standards 150, the location of which may be best described as being closely adjacent to the outer corners of the frames which constitute the supports of the roller-aprons forming the floors of the packing-chambers when said frames are in normal position. The uprights 150 are provided at their upper ends with brackets or goosenecks 151, all of which extend inwardly in the direction of the center of the packing-chambers. The inner or free ends of the brackets 151 support coiled springs 152, which terminate in outwardly-extending arms 153, the free ends of which have eyes 154, through which is passed a tightening-cord 155, the front end of which has a ring or link 156, through which the opposite end extends in a forward direction, as shown at 157, after passing through the eyes at the outer end of the spring-arm. In this form a twine-can 158 is employed, the twine from which, 159, passes across the path of the corn into the packing-chambers and is temporarily attached to a hook 160, suitably located upon the machine-frame. The uprights or supports 150 are of a height sufficient to support the spring-arms and the cord 155 above the corn as the latter passes into the packing-chambers. The corn in entering will engage the twine 159, which thus becomes looped around the shock. When a sufficient quantity has accumulated, the machine is stopped. The driver by pulling the projecting end 157 will then constrict the loop of the cord 155 around the shock, the strain upon the spring-arms 153 causing the latter to move in a downward and inward direction, thus compressing the shock at the desired point, after which the driver by simply turning in his seat may reach the ends of the binding-twine and quickly tie the shock, either before or after cutting the twine at the desired point. The machine is then started. The driver by pressure of his foot upon the foot-lever starts the dropping mechanism, and the shock is deposited upon the ground and the working parts of the machine are restored to their normal position. A twine-cutter may, if desired, be secured in a suitable position close to the hook 160 in order to enable the twine to be quickly and conveniently severed. It will thus be seen that this form of my invention practically differs from the preferred form, which includes the automatic binding mechanism only in the substitution for the said automatic binding means of the shock-compressing and hand-binding means arranged as described.

I would have it understood that I have in the foregoing described the preferred construction of my invention; but I do not necessarily limit myself to the precise structural details herein employed. Modifications might thus, for instance, be made in the frame structure, in the means for transmitting motion between the parts, in the location or disposition of the parts with relation to each other, and in many other respects without materially departing from the scope of my invention. It will also be obvious that as regards such parts of the device as are individually well known and in ordinary use—such as, for instance, the needles and knot-tying means—I do not regard myself as being limited to any particular structure. The same will hold good with reference to the cutting device and the endless carriers coöperating therewith. Be it understood, therefore, that I reserve the right to any and all changes, modifications, and alterations which may be resorted to within the scope of my invention and without departing from the spirit or sacrificing the utility of the same.

Having thus described my invention, I claim—

1. A corn-harvester having corn engaging and cutting means, a receiving-space for the corn to be bound, intermediate guideways to guide the corn from the engaging and cutting devices to the receiving-space, endless carriers to convey the corn, standing, along said guideways, vertical shafts disposed adjacent to the latter and having arms adapted to be projected across said guideways, means whereby said shafts are connected to be operated simultaneously, binding mechanism including a horizontally-swinging needle, and an arm extending from one of the vertical shafts in the path of said needle to be engaged thereby.

2. In a corn-harvester, a receiving-space constituting a packing-chamber, a floor for the same consisting of a movable frame having rollers supporting an endless apron, and a rear end-gate supported upon said movable frame.

3. In a corn-harvester, a receiving-space constituting a packing-chamber, a floor for the same consisting of a laterally-movable frame having rollers supporting an endless apron, and means for operating the apron-carrying rollers when the position of the frame is shifted.

4. In a corn-harvester, a receiving-space constituting a packing-chamber, a floor for the same consisting of a movable frame having rollers supporting an endless apron, a pinion upon one of the roller-shafts and a stationary rack engaging said pinion.

5. In a corn-harvester, a receiving-space constituting a packing-chamber, horizontally-disposed track-bars at the front and rear lower ends thereof, rollers engaging said track-bars and connected by a longitudinal shaft, arms pivoted on said shafts and having downwardly-curved ends provided with friction-rollers engaging the under sides of the track-bars, a shaft connecting the free ends of said arms, rollers upon said shafts, and an endless apron mounted upon the rollers and constituting the floor of the receiving-space.

6. In a corn-harvester, a receiving-space comprising two packing-chambers separated by a central partition having inclined inner walls, laterally-movable frames constituting the floors of said packing-chambers, rollers in said frames carrying endless aprons, and means for simultaneously operating said laterally-movable frames.

7. In a corn-harvester, a receiving-space comprising two packing-chambers separated by a central partition having inclined walls, a hinged ridge-bar supporting said walls, movable frames constituting the floors of the packing-chambers, and toggle connections between said frames and the hinged ridge-bar.

8. In a corn-harvester, a receiving-space comprising two packing-chambers separated by a central partition having inclined walls, a hinged ridge-bar supporting said walls, tracks disposed laterally in the frame of the machine, bottom frames for the packing-chambers disposed movably upon said laterally-extending tracks, means for simultaneously operating said bottom frames, and toggle connections between said frames and the hinged ridge-bar.

9. In a corn-harvester, a receiving-space comprising two packing-chambers separated by a central partition having inclined walls, a hinged ridge-bar supporting said walls, laterally-extending track-bars at the front and rear lower ends of the packing-chambers, roller-frames supported upon said track-bars and constituting the floors of the packing-chambers, and toggle connections between said frames and the hinged ridge-bar, and means for simultaneously operating said frames.

10. In a corn-harvester, a receiving-space for the corn to be bound, a vertically-movable partition in said receiving-space, a ridge-bar supporting said partition, laterally-movable devices constituting the floor of the receiving-space and toggle connections between said laterally-movable devices and the ridge-bar.

11. In a corn-harvester, a receiving-space for the corn to be bound and a floor for said space consisting of a slidable frame carrying an endless apron.

12. In a corn-harvester, a receiving-space for the corn to be bound, movable frames constituting the floor of said receiving-space, binding mechanism including a horizontally-swinging needle, means for operating said movable frames and trip mechanism for said operating means.

13. In a corn-harvester, a receiving-space for the corn to be bound, movable frames constituting the floor of said receiving-space, binding mechanism including a horizontally-swinging needle and a knotter, means for operating the bottom frames to withdraw them from and restore them to position at the lower end of the receiving-space, and trip mechanism connected with the needle and operated on the return movement of the latter, after engaging the knotter, to start said operating mechanism for withdrawing and restoring the movable flooring-frames.

14. In a corn-harvester, a receiving-space for the corn to be bound, laterally-movable flooring-frames, rock-shafts having cranks at the ends thereof, pitmen connecting said cranks with the flooring-frames, connecting means between said rock-shafts whereby they may be simultaneously operated, operating means for said rock-shafts, binding mechanism including a horizontally-swinging needle and a knotter, and trigger means to actuate the operating means of the rock-shafts imparting movement to the movable flooring-frames.

15. In a corn-harvester, a receiving-space for the corn to be bound, movable frames constituting the floor of said receiving-space, rock-shafts and cranks at the ends thereof, pitmen connecting said cranks with the flooring-frames, connecting means between said rock-shafts whereby they may be simultaneously operated, a movable sleeve upon the extended end of one of the rock-shafts having a half-gear engaging said rock-shaft, a drive-shaft having oppositely-faced bevel-gears adapted to engage said half-gear, a lever loosely connected with said sleeve, binding mechanism including a horizontally-swinging needle, a hub on the needle-shaft carrying a pivoted spring-actuated trigger and a stop for the same, a lever pivoted in proximity to the needle-carrying standard and extended in the path of the trigger, a retracting-spring connecting said lever with the standard, and connecting means between said lever and the lever engaging the sleeve carrying the half-gear.

16. In a corn-harvester, a receiving-space for the corn to be bound, means for packing the corn in said receiving-space, conveying means opening into the receiving-space, means for temporarily obstructing the paths opening into the receiving-space, binding mechanism including a horizontally-swinging needle and a knotter, laterally-movable devices constituting the floor of the receiving-space, and means for operating said devices to withdraw them from and restore them to position.

17. In a corn-harvester, a receiving-space for the corn to be bound, a vertically-movable partition in said receiving-space, a ridge-bar supporting said partition, laterally-movable devices constituting the floor of the receiving-space, toggle connections between said laterally-movable devices and the ridge-bar and means for binding the shock above said ridge-bar.

18. In a corn-harvester, a receiving-space for the corn to be bound, a vertically-movable partition in said receiving-space, a hinged ridge-bar supporting said partition, laterally-movable devices constituting the floor of the receiving-space, toggle connections between said laterally-movable devices and the ridge-bar, means for binding the shock above the ridge-bar, end-gates supported upon the laterally-movable flooring devices, and operating means for actuating the binder means and the laterally-movable flooring devices.

19. In a corn-harvester, a receiving-space for the corn to be bound, twine-holding means, means for conveying the cut corn into said receiving-space across the twine, packing means within the receiving-space, a laterally-movable flooring and an end-gate carried by said flooring.

20. In a corn-harvester, a receiving-space for the corn to be bound, laterally-movable devices constituting the floor of said receiving-space, rock-shafts having cranks and pitmen connecting said cranks with the laterally-movable flooring devices, means for operating said rock-shafts, lever means for throwing said operating means into gear, and automatic stop mechanism for throwing said operating means out of gear at the completion of the operation.

21. In a corn-harvester, a receiving-space for the corn to be bound, a vertically-movable partition in said receiving-space, a ridge-bar supporting said partition, laterally-movable devices constituting the floor of the receiving-space, toggle connections between said laterally-movable devices and the ridge-bar, and means for obstructing the passage of cut corn to the packing-chamber, said means including a vertical shaft provided at its lower end with a projection lying in the path of one of the toggles.

In testimony that I claim the foregoing as my own I have hereto affixed my signature in the presence of two witnesses.

GEORGE W. CULP.

Witnesses:
S. W. EDSON,
A. W. GREENLEE.